United States Patent Office 3,130,216
Patented Apr. 21, 1964

3,130,216
PREPARATION OF NICKEL COMPLEXES OF CYCLOBUTADIENE
Harold H. Freedman, Brookline, Mass., assignor to The Dow Chemical Company, Midland, Mich., a corporation of Delaware
No Drawing. Filed Nov. 28, 1960, Ser. No. 71,898
2 Claims. (Cl. 260—439)

This invention relates to a method for preparation of metal complexes of cyclobutadiene derivatives, and to a method of their preparation wherein a halodienyl alkyl metal halide is treated with an appropriate transition metal compound to yield the complex consisting of the transition metal salt and the cyclobutadiene.

Compounds which carry in their structure a metal atom in combination with organic moieties find a wide variety of uses in situations where free radicals are desired, or free radicals involving the metal are to be used. Situations of this kind involve catalysis of vapor phase chemical reactions. The addition of an alkyl lead compound to gasoline as an anti-knock agent is an example of a vapor phase reaction controlled by a metal-organic compound. These metal-organic compounds may also be used for the control of chemical reactions involving the formation of radicals.

It is, accordingly, a fundamental object of this invention to provide a process readily controllable for the preparation of metal complexes of cyclobutadiene and its derivatives.

It is another object of the invention to provide a method for the preparation of a cyclobutadiene which exists as stabilized by the transition metal compound.

Other objects and advantages of the invention will in part be obvious and in part appear hereinafter.

The invention, accordingly, is embodied in the preparation of cyclobutadiene derivatives and metal complexes thereof, wherein a halobutadienyl alkyl metal halide is reacted with an appropriate transition metal compound to yield the complex of the corresponding cyclobutadienyl compound and the transition metal compound. For the preparation of the complex which may be desired in accordance with whatever processing an operator has in mind, it is necessary to react a compound of the transition metal with the appropriate halobutadienyl metal halide.

As a mechanism for the reaction, it may be assumed that the metal-butadienyl starting compound probably first yields a cyclobutadienyl di-radical which is stabilized by the available transition metal compound in the system.

This method of preparing these complex compounds has the advantage that it produces substantial yields, approaching quantitative yields, by way of a direct reaction of two compounds. Some cyclobutadienyl metal complex compounds have been prepared and reported in literature, such, for example, as the iron tricarbonyl complex of tetraphenylcyclobutadiene and the nickel chloride complex of tetramethylcyclobutadiene and silver nitrate complex of cyclobutadiene, but the methods of formation are so complex normally as to result in such extremely poor yields that the products are not available for possible application in any kind of commercial system.

In accordance with the process described in the instant application these compounds can be prepared in substantially quantitative yield and in substantially pure form.

The following examples will illustrate more precisely the method by which the compounds can be prepared:

EXAMPLE I

Preparation of the Nickel Bromide Complex of Tetraphenylcyclobutadiene

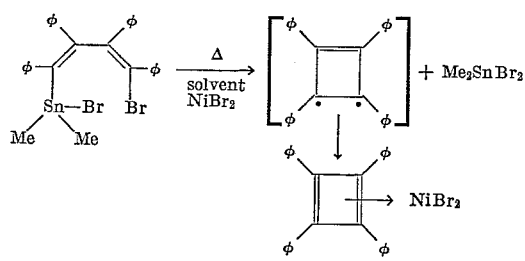

In a suitable vessel equipped with a stirrer and a nitrogen inlet is placed 6.65 grams (0.01 mol.) of (4-bromo-cis,cis - butadienyl)-dimethyltin-bromide (melting point 142–3° C.) dissolved in 75 milliliters of dry dimethoxy-triethyleneglycol (Ansul 161), along with 2.51 grams (0.0115 mol.) of anhydrous nickel bromide. The stirrer is started, nitrogen is introduced, and the reaction mixture heated over a 15-minute period to 145±5° C. When the temperature reaches ~125° C., the mixture turns a deep blue and after approximately 30 minutes at 145° C., most of the yellow-brown nickel bromide disappears and is replaced with a blue-black solid. Stirring and heating is maintained for a total of 90 minutes, and the reaction mixture is then cooled and filtered. The solid which weighs approximately 5 grams is washed repeatedly with benzene and then extracted continuously in a Sohxlett apparatus with 200 milliliters of methylene chloride. When all the complex has been extracted, the blue-green methylene chloride solution is evaporated to yield 4 grams (70%) of blue-black small crystals which on recrystallization from bromobenzene or from other halogenated aliphatic or aromatic solvents analyzes for $C_{28}H_{20} \cdot NiBr_2$ (found: C, 58.4; H, 3.6; Br, 27.9; NiO, 12.5).

EXAMPLE II

Using the same procedure given in Example I the corresponding complexes of nickel chloride and other nickel salts can be prepared.

As starting materials the halobutadienyl alkyl metal halide may include any of the group IV metals, excluding silicon, but including tin, lead and germanium and mercury as starting compounds. Accordingly the phenyl and methyl substituted compounds are found useful. In fact any of a variety of these groups may be employed including halogens. Similarly the metal compounds to be used in the process can be any nickel salt of suitable solubility.

Typical compounds which can be prepared according to this invention are the following:

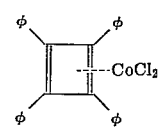

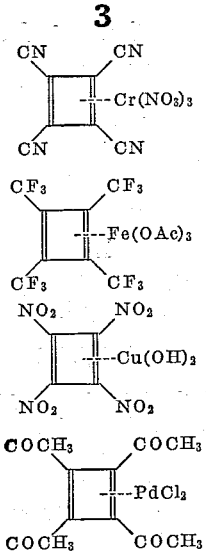

Turning now to the process it should be noted that the solvent and temperature are important variables to be controlled for accomplishment of a successful reaction. It is apparent that it is the effect of the solvent, at least in part, in bringing about the transformation of the starting material into the intermediate butadiene or cyclobutadiene di-radical. Fundamentally, it may be noted that the preferred temperature range for the reaction is from about 100°–175° C., and in general solvents which will maintain a liquid phase without serious problem in this temperature range are indicated. Typical solvents are dimethyl ethers of diethylene and triethylene glycol. These have requisitely high boiling points and are further advantageous in that they are completely inert to the reactions occurring in the system. In general the solvents should be non-reactive, have relatively high boiling points and have a solvating power for the radicals formed in the reaction.

In the adoption of other metal compounds or metal compounds having different organic moieties as starting materials, the actual properties of the starting materials and the products will dictate the temperature ranges which will be desirable.

For example, starting with the lead compounds, it should be possible to operate at lower temperature inasmuch as they are more easily cleaved than others.

In general, all of the complexes formed are crystalline compounds of dark color, stable to temperatures approximating 200° C. and are soluble in halogenated solvents. They are useful as anti-knock agents; generally useful as additives to reactions being conducted in the vapor phase or for the liquid phase; slimicides, and sources of metal in electroplating baths.

In my copending application, Serial No. 71,899, now Patent No. 3,090,797, filed of even date herewith, which may be considered fully incorporated herein I describe the preparation of certain cis,cis-butadienyl metal halides.

What is claimed is:

1. The method of preparing nickel salt complexes of cyclo-butadiene compounds which comprises reacting a 4-halo-butadienyl organo metal halide of a metal selected from the group consisting of tetravalent tin, lead, germanium, and mercury, said organo group being selected from the group consisting of phenyl and methyl, with a nickel salt selected from the group consisting of nickel chloride and nickel nitrate in liquid phase, at a temperature which maintains the reactant material in the liquid phase and, thereafter, recovering the cyclo-butadiene nickel salt complex.

2. The method in accordance with claim 1 in which a tetraphenyl-4,halo-butadienyl metal halide is reacted with a nickel salt in an anhydrous medium.

No references cited.